(12) United States Patent
Drummond

(10) Patent No.: US 7,185,920 B2
(45) Date of Patent: Mar. 6, 2007

(54) RETRACTABLE WHEEL AND TRACK COVERS

(76) Inventor: David Carl Drummond, PO Box 282, Brookfield, Colchester County, Nova Scotia (CA) B0N 1C0

( * ) Notice: Subject to any disclaimer, the term of this patent is extended or adjusted under 35 U.S.C. 154(b) by 268 days.

(21) Appl. No.: 10/740,825

(22) Filed: Dec. 22, 2003

(65) Prior Publication Data
US 2004/0164540 A1    Aug. 26, 2004

Related U.S. Application Data

(60) Provisional application No. 60/435,358, filed on Dec. 23, 2002.

(51) Int. Cl.
*B62D 25/18* (2006.01)
*B60R 9/02* (2006.01)

(52) U.S. Cl. ...................... 280/851; 280/770

(58) Field of Classification Search ............... 280/851, 280/848, 154, 43.2, 847, 770; 298/1 SG; 296/37.6, 39.2, 98, 136
See application file for complete search history.

(56) References Cited

U.S. PATENT DOCUMENTS

| 1,918,423 | A | * | 7/1933 | Persinger ...................... 160/24 |
| 2,230,908 | A | * | 2/1941 | Reiman ........................ 296/98 |
| 2,460,394 | A | * | 2/1949 | Peatross ...................... 280/770 |
| 2,679,406 | A |   | 5/1954 | Howard et al. |
| 2,721,760 | A | * | 10/1955 | Lapham et al. ........... 298/1 SG |
| 3,050,075 | A | * | 8/1962 | Kaplan et al. ................. 296/98 |
| 3,146,824 | A | * | 9/1964 | Veilleux ..................... 160/23.1 |
| 3,563,594 | A | * | 2/1971 | London ...................... 293/128 |
| 4,124,221 | A | * | 11/1978 | Goings ......................... 280/851 |
| 4,268,053 | A |   | 5/1981 | Toppins et al. |
| 4,406,474 | A |   | 9/1983 | Scharf |
| 4,436,319 | A |   | 3/1984 | Clutter |
| 4,530,519 | A | * | 7/1985 | Marshall ..................... 280/770 |
| 4,718,711 | A | * | 1/1988 | Rabbit ................... 296/136.03 |

(Continued)

FOREIGN PATENT DOCUMENTS

CA      1108664        9/1981

(Continued)

*Primary Examiner*—Christopher P. Ellis
*Assistant Examiner*—Bridget Avery
(74) *Attorney, Agent, or Firm*—Jones, Tullar & Cooper, P.C.

(57) ABSTRACT

The invention provides a retractable cover apparatus, which when extended to cover the wheel or track area of a variety of vehicles minimizes the amount of spray and debris flying from the tires or tracks of the vehicle. The cover system is mounted to the frame of a vehicle without requiring extensive modifications to the frame, and includes, for each side of the vehicle, an elongated flexible cover having first and second ends and a width sufficient to extend laterally outwardly beyond an outer extent of the wheels or tracks of the vehicle. The cover system also include at least first and second cover housings, one of the housings adapted to contain the cover in a rolled retracted condition and the other housing being adapted to anchor a free end of the cover in an extended condition thereof. At least one support bar is removably mounted to the frame of the vehicle over which the cover is supported. When the cover is required, it is pulled from the one cover housing, over the support bars and is anchored in place at the other cover housing.

48 Claims, 11 Drawing Sheets

U.S. PATENT DOCUMENTS

| | | | |
|---|---|---|---|
| 4,856,842 A * | 8/1989 | Ross et al. | 296/136.03 |
| 5,022,700 A * | 6/1991 | Fasiska et al. | 296/98 |
| 5,176,421 A * | 1/1993 | Fasiska | 296/136.03 |
| 5,938,263 A * | 8/1999 | Barthelman | 296/37.6 |
| 6,296,279 B1 * | 10/2001 | Stoddard et al. | 280/770 |
| 6,354,625 B1 | 3/2002 | Lambertus | |
| 6,412,851 B1 * | 7/2002 | Burks et al. | 296/98 |
| 6,565,122 B1 * | 5/2003 | Hansen | 280/851 |
| 6,981,509 B2 * | 1/2006 | Sharapov | 135/88.11 |

FOREIGN PATENT DOCUMENTS

CA    1260990    9/1989

* cited by examiner

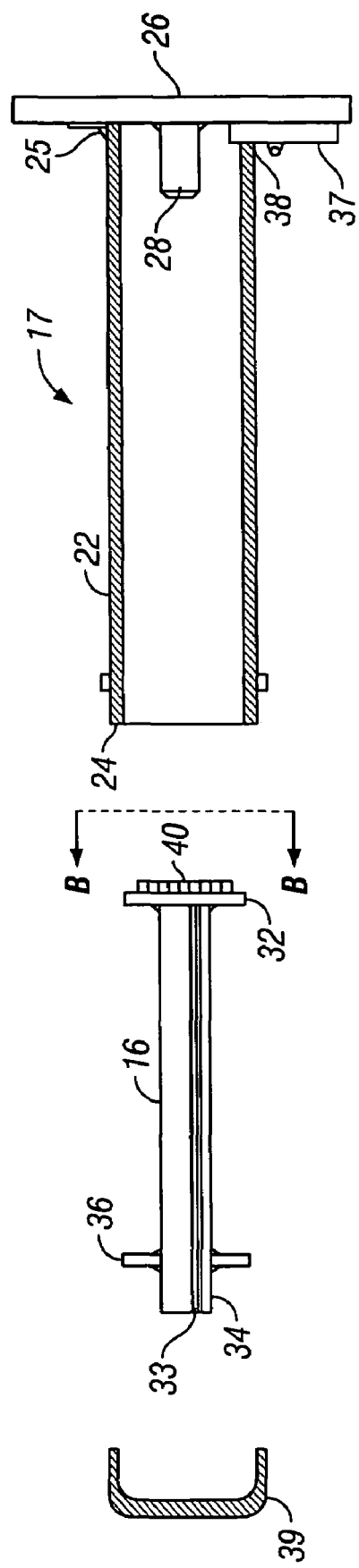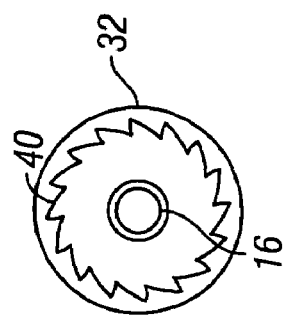
FIG. 6
FIG. 6A
FIG. 7

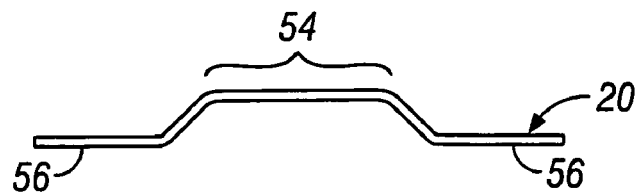
FIG. 8A
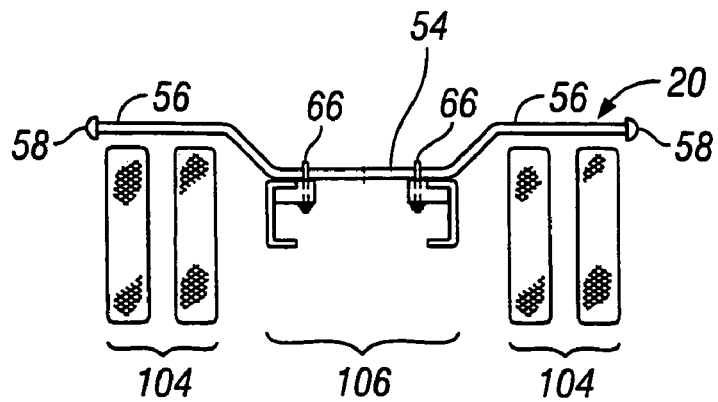
FIG. 8B
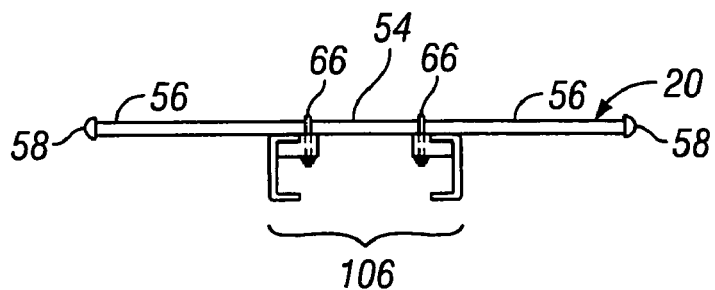
FIG. 8C
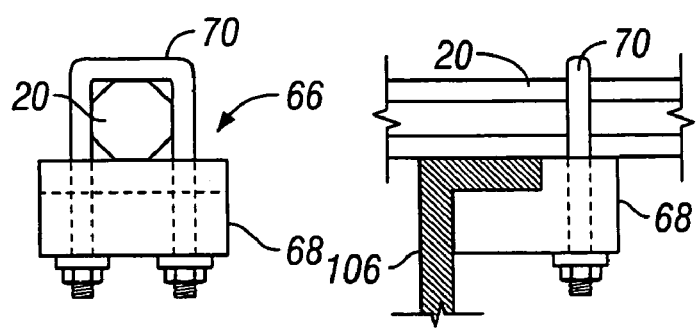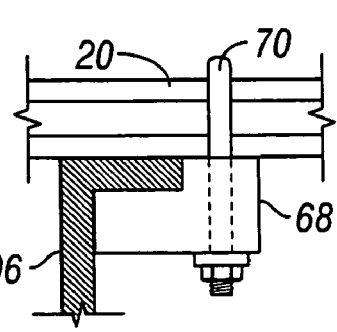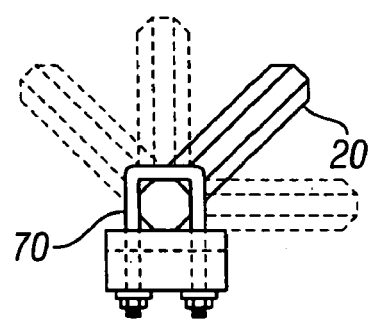
FIG. 8D          FIG. 8E          FIG. 8F

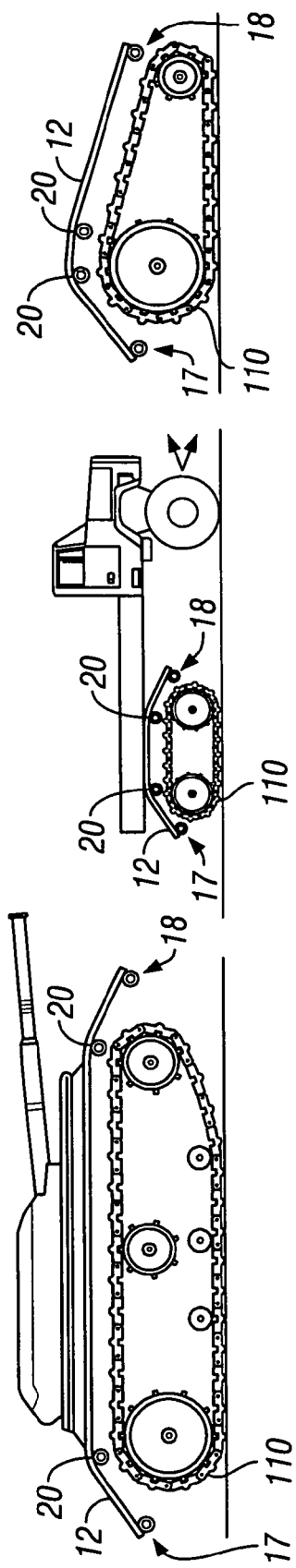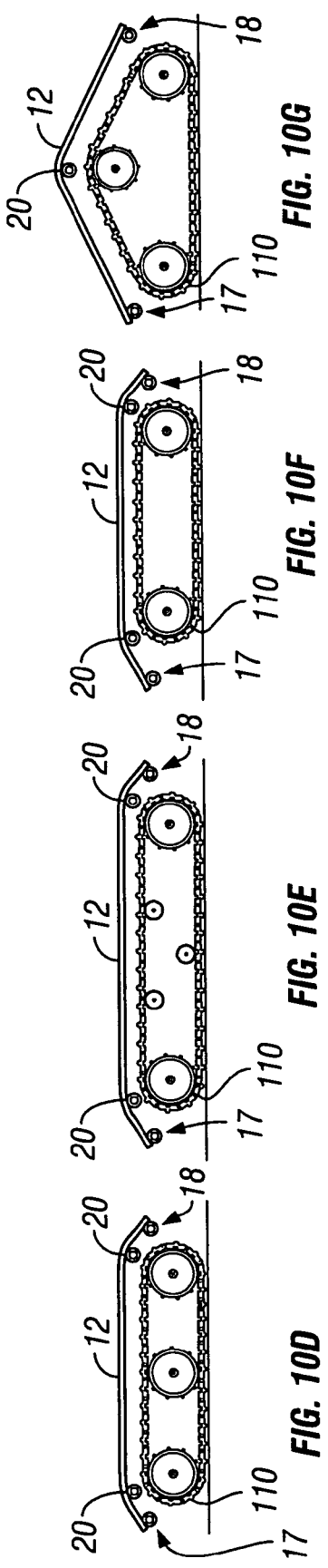

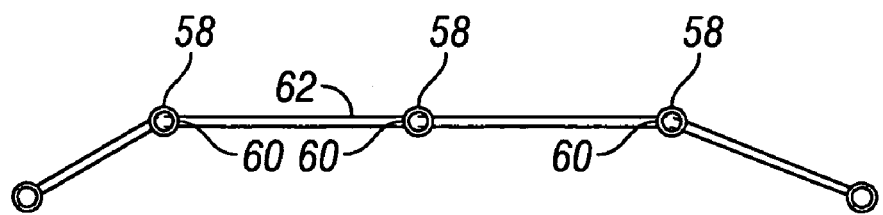
FIG. 11A
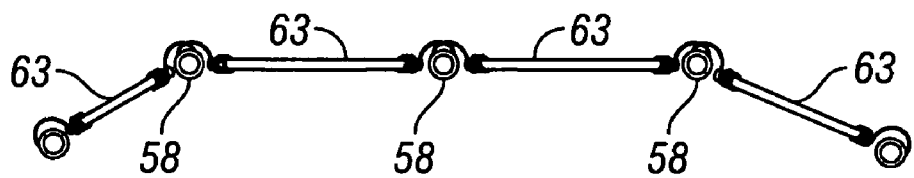
FIG. 11B
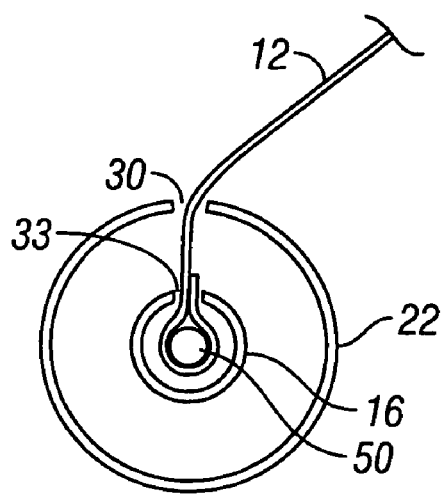 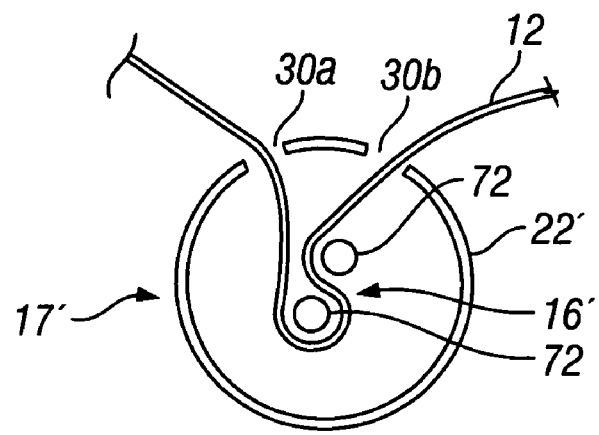
FIG. 12A  FIG. 12B

RETRACTABLE WHEEL AND TRACK COVERS

This application claims the benefit of U.S. Provisional Application No. 60/435,358, filed Dec. 23, 2002, the disclosure of which is hereby incorporated herein by reference.

THE FIELD OF THE INVENTION

This invention relates to retractable covers for use with wheeled or track-laying vehicles.

BACKGROUND OF THE INVENTION

It is well known that when large vehicles such as commercial trucks are driving over rough terrain, there can be quite devastating effects to the upper body and conventional rigid fenders of the vehicle, as well as to surrounding vehicles, caused by material and debris flying from the vehicle tires. The flying debris can range in size from small gravel pieces escaping from between the treads of the tires to larger items such as a chimney brick stuck between tires.

As well, when vehicles are driving during adverse weather conditions such as rain, sleet or snow, cars that are following or passing such vehicles can suffer reduced visibility due to the spray from the tires of the vehicles. Large vehicle tires can each move up to 90 gallons of water per minute from the road surface when travelling at speed, and a large portion of the water is squeezed out behind each tire, creating a plume of almost solid water extending in an arc over the road surface from the rear of the vehicle. This presents a significant danger to anyone following or being passed by these large vehicles. While conventional mud flaps help reduce the effects of spray from the rear of a truck, they provide no protection against damage to the cab of the truck itself caused by the flying debris.

The same is true for a large variety of vehicles, whether they are of the wheeled or tracked type, such as military vehicles, construction machinery, trail groomers, farm equipment, and various multi-purpose trail and recreational vehicles. The common factor is that when any such vehicles are driving over rough terrain, unpaved or gravel roads, sandy areas, fields, construction sites, etc. and have exposed wheels or tracks, there is a risk of damage due to the debris flying from the tires, or treads of the tracks in the case of track-laying vehicles, as well as the undesirable dust clouds that may be created. The problems associated with driving in adverse weather conditions discussed above or similar problems encountered when driving over snow, ice, slush, and muddy or wet terrain are also relevant to the various types of vehicles. In fact the same is true when driving over any material which may impede the operation of the wheeled or track-laying vehicle. The damage caused by flying debris and the dangers and inconvenience associated with the spray and dust clouds from the tires or tracks of vehicles are problems that need to be addressed. Therefore, there is a need for a cover system that is suitable for use with a variety of vehicles whether they be wheeled or of the track-laying type.

Fender devices aimed at reducing the spray from the tires of large vehicles are known, and usually take the form of rigid structures that are secured in place over the wheels of the vehicle. Rigid wheel or track covers are not the most favourable as they can be subject to significant stresses due to the twisting/bending of the frame of the vehicle when driving which can damage such rigid fenders or covers. As the axles of vehicles flex up and down, rigid covers and their supports may be damaged. Rigid fenders or covers can also be damaged by the flying debris that comes into contact with them, and they also make access to the wheels, axles and frame of the vehicle difficult when maintenance is required. Most of the prior art fender systems are bolted or welded directly to the frame of the vehicle, which can weaken and therefore reduce the structural integrity of the frame. Furthermore, rigid fenders or covers are difficult to adapt to a variety of different vehicles.

U.S. Pat. No. 2,679,403 discloses wheel guards for trucks for protecting the truck cab and gas tanks from mud, tar, stones and other material thrown from the traction wheels. The guards include a rectangular frame having a curvature greater than that of the tires, and a body of flexible material disposed thereon. The guard assembly is then secured to a support bar that extends transversely from the frame and extends over the upper front portions of the wheels. An additional flap of material is attached to the top of the frame and extends upwardly and rearwardly therefrom to a location adjacent the bottom surface of the trailer. Although the guard material is flexible and, therefore, less susceptible to damage from flying debris, the guard only serves to protect the front portion (i.e. truck cab and gas tanks) of the vehicle.

U.S. Pat. No. 4,268,053 discloses a mounting mechanism for holding the wheel fender on a frame of a vehicle while still allowing the fender to pivot independently with respect to the frame. By enabling the wheel fender to twist or float with respect to the vehicle frame, the stresses on the fender caused by the twisting of the frame of the vehicle are minimized, thereby reducing the amount of damage to the wheel fender. However, the fender is made of rigid material which can be damaged by the flying debris, and the fender assembly cannot be easily removed from the wheel area and stored for later use.

U.S. Pat. No. 4,406,474 represents an improvement over the commonly owned '053 patent discussed above. Therefore, while it discloses an improved structure for the attachment of a fender to a vehicle that allows controlled relative movement between the vehicle frame and the fender, it too is subject to the same disadvantages discussed in relation to the '053 patent.

U.S. Pat. No. 4,436,319 discloses a wheel splash guard to help reduce dangerous spray and splash from the wheels of the vehicle. The guard comprises a double-walled lightweight molded plastic structure that fits over the wheels, or can be adapted to fit over tandem wheels. The inner wall of the guard has apertures therein through which spray from the tires can pass. The outer wall has no apertures on its surface, but is spaced a distance from the inner wall and attached thereto along the lower edges of the side portions of the guard. Accordingly, an opening is created between the lower rear edges of the guards. The guard allows water to drain between the two walls toward the ground, so that the spray is dispersed directly to the ground and not in the direction of passing vehicles. Once again, while the guards help to reduce spray, they cannot be easily removed and stored or immediately adapted for use with a variety of vehicles.

U.S. Pat. No. 6,354,625 discloses a fender system that allows for easy attachment of the fender to the vehicle and facilitates alignment of the fender with the wheel. The fender is adapted to be mounted on a mounting bracket and has at least one flange extending therefrom that is adapted to the contour of the mounting bracket so that alignment of the fender occurs as it is mounted thereon. The fender is shaped so as to enclose the upper half of the wheel and is fixed to the mounting bracket by way of screws. While the fender disclosed in the '625 patent may facilitate the mounting procedure, the fender itself is rigid, cannot be easily removed and conveniently stored for later use, and prevents access to a portion of the wheel. Accordingly, the fender disclosed in the '625 patent does not address all the problems encountered in the art.

Canadian Patent No. 1,260,990 relates to an apparatus for suppressing spray generated by a driving vehicle. Flexible, porous material that has a density sufficient to block the passage of water droplets while allowing passage of air therethrough is attached over the upper portion of the wheel and acts as a water filter. Therefore the water droplets are prevented from creating a large spray or plume. The apparatus does little to prevent damage from flying debris to the vehicle and/or underside of a trailer. Furthermore, once it is secured to the vehicle it cannot be easily removed and stored for later use.

Canadian Patent No. 1,108,664 relates to a retractable mudguard for cycles. Although it suggests a certain convenience associated with retractable fenders or covers, it does not address all of the problems associated with other types of vehicles.

Therefore, a cover system with numerous applications that is durable, adaptable to a variety of vehicles, easy to install without altering the frame of the vehicle, and which can be quickly retracted away from the wheel or track area of the vehicle and conveniently stored, is desirable.

SUMMARY OF INVENTION

The cover system of the present invention provides a retractable cover apparatus, which when extended to cover the wheel or track area of a variety of vehicles minimizes the amount of spray and debris flying from the tires or tracks in order to reduce the inconveniences associated with the plumes of spray and dust clouds that are created behind the moving vehicles, prevents damage to the body of the vehicle as well as to other vehicles travelling in the vicinity, and addresses the problems associated with prior art fender systems discussed above.

Therefore, according to one aspect of the invention, there is provided a cover system for reducing spray and debris flying from wheels or tracks of a vehicle in motion, comprising, for each side of the vehicle, an elongated flexible cover having first and second ends and a width to extend laterally outwardly beyond an outer extent of the wheels or tracks of the vehicle. The cover system also includes first and second cover housings, with one of the housings being adapted to contain the cover in a rolled, retracted condition, and the other housing being adapted to anchor a free end of the cover in an extended condition. The first housing is removably mountable to a frame of the vehicle forward of the wheels or tracks and extends laterally outwardly of the frame while the second housing is removably mountable to the frame rearward of the wheels or tracks so as to extend laterally outwardly therefrom. The cover system further includes at least one support bar removably mountable to the frame intermediate the first and second housings so as to extend laterally of the frame beyond the outer extent of the wheels or tracks for supporting the cover in the extended condition thereof.

According to another aspect of the invention, the cover system comprises, for each side of the vehicle, an elongated flexible cover having first and second ends and a width to extend laterally outwardly beyond an outer extent of the wheels or tracks of the vehicle, and first, second and third cover housings wherein the first housing is adapted to contain the cover in a rolled, retracted condition thereof, and each of the second and third housings is adapted to anchor a free end of the cover in an extended condition. In such an embodiment, the second housing is removably mountable to a frame of the vehicle forward of the wheels or tracks so as to extend laterally outwardly of the frame, and the third housing is removably mountable to the frame rearward of the wheels or tracks so as to extend laterally outwardly of the frame. The first housing is removably mountable to the frame intermediate the second and third housings so as to extend laterally outwardly of the frame. The cover system further includes at least one support bar removably mountable to the frame intermediate the first and second housings, and at least one support bar removably mountable to the frame intermediate the first and third housings, wherein both of the at least one support bars extend laterally of the frame beyond the outer extent of the wheels or tracks and support either a forward or rearward portion of the cover in the extended condition thereof.

BRIEF DESCRIPTION OF THE DRAWINGS

The present invention will be better understood with reference to the detailed description taken in combination with the drawings in which:

FIGS. 4A and 4B are detail side views of the cover housing of the cover system wherein FIG. 4A shows the cover housing with the cover in place, while FIG. 4B shows the side view of the cover housing without the cover;

FIG. 6 is an exploded view of the first cover housing;

FIG. 6A is a view of the first cover housing taken along section line B—B of FIG. 6.

FIG. 7 is a side view of the cover end which engages the second cover housing to anchor the cover in place;

FIG. 8A is a front view of a support bar;

FIGS. 8B and 8C are rear views of different shaped support bars mounted to the frame of a truck;

FIG. 8D is a detail side view of a mounting mechanism used to secure a support bar to the frame;

FIG. 8E is a detail rear view of the mounting mechanism and support bar;

FIG. 8F is a view of potential mounting positions of a U-Shaped support bar taken along section line 8F—8F in FIG. 8B;

FIGS. 10A–10G are schematic side views of various configurations of the cover system in use with track-laying vehicles;

FIGS. 11A–11B are schematic side views when the cover is retracted showing the support bar caps having cables attached thereto;

FIG. 12A is a detail end view of the first cover housing of the cover system;

FIG. 12B is a detail end view of a double-exit cover housing according to an embodiment of the invention;

DESCRIPTION OF THE PREFERRED EMBODIMENTS

Figure 1A:
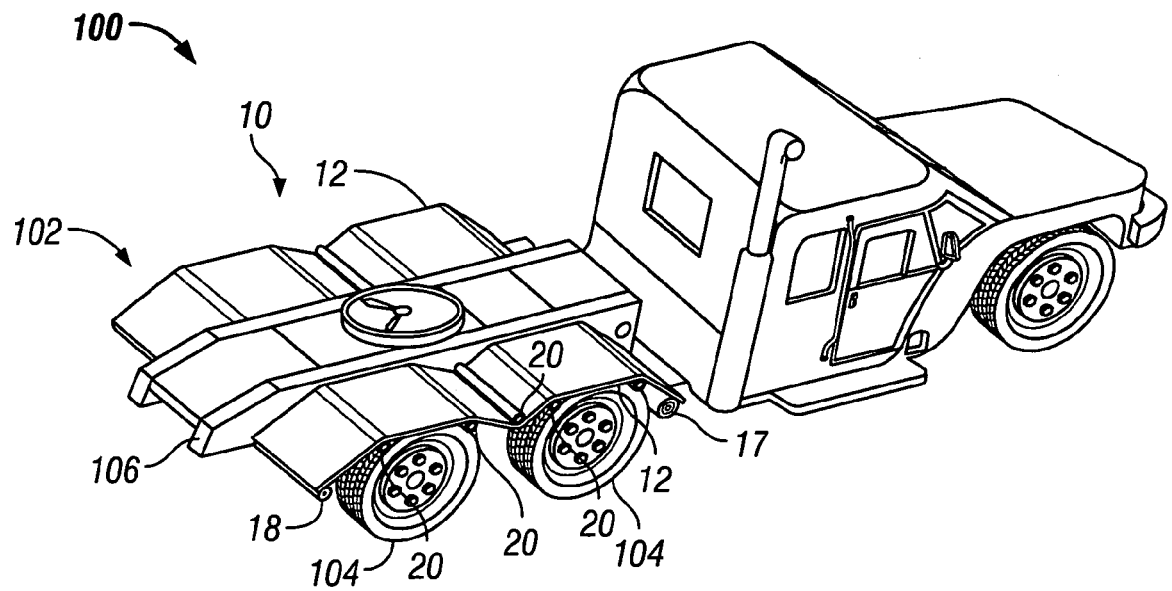
FIG. 1A is a perspective view of a truck cab showing the retractable cover system in use.

Referring to the drawings, there is shown in FIG. 1A a vehicle or truck cab 100 with a dual axle exposed trailer portion 102 employing the cover system 10 of the present invention. According to the preferred embodiment, the cover system 10 comprises, for each side of the vehicle, an elongated flexible cover 12 having first and second ends and a width sufficient to extend laterally outwardly beyond an outer extent of the wheels or tracks 104 of the vehicle 100, that is capable of being stored on a spool 16 (see FIG. 6). A first cover housing 17 is provided at one end of said frame 106 and is adapted to contain the spool 16 with the cover 12 in a rolled, retracted condition. A second cover housing 18 is positioned opposite to the first cover housing along the length of the frame 106 and is adapted to anchor a free end of the cover 12 when the cover is in an extended position. When the cover 12 is in use, it is pulled from the first cover housing 17 and supported above the wheels 104 by means of support bars 20 (see FIG. 2), which are spaced along the length of the frame 106 intermediate the first and second cover housings 17, 18, and is anchored in place at the second cover housing 18. When the cover 12 is no longer needed, it can be released from the second cover housing 18 and conveniently stored in the first cover housing 17.

Figure 1B:
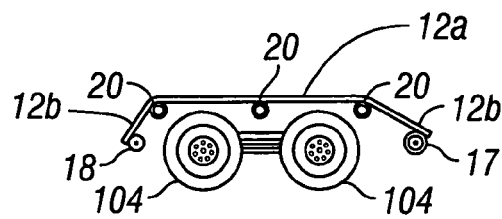
FIGS. 1B–1D are schematic side views of various cover system configurations.
Figure 1C:
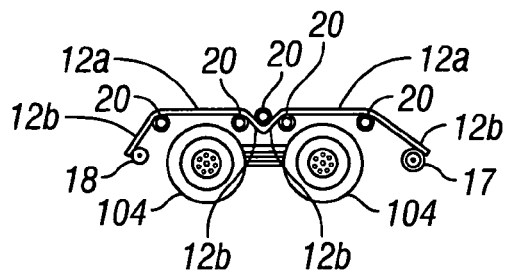
Figure 1D:
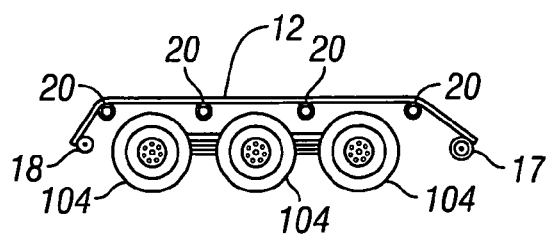

As shown in the drawings, the cover system 10 is adaptable for numerous models of trucks, trailers and vehicle frames. FIGS. 1B–1D show various configurations of the cover system 10 when the covers 12 are in place over the wheels 104 of a vehicle. For a vehicle with a dual axle trailer, as shown in FIG. 1B, the cover system 10 can be mounted to the vehicle so that each cover 12 comprises a horizontal top portion 12a supported entirely above the wheels 104, and two inclined end portions 12b. Alternatively, the cover system 10 can be mounted so that the covers 12 adapt more to the contours of the wheels in that there is a horizontal top portion 12a and two associated inclined end portions 12b for each wheel 104, as shown in FIG. 1C. FIG. 1D shows a variation of the mounting scheme described in relation to FIG. 1B, but adapted for a triple axle trailer.

The covers 12 may be made of a non-metallic vinyl and threaded rubber so that the outer surface of the material is smooth while the under surface of the material adjacent the wheels 104 of the vehicle is textured which helps to reduce the ricochet effect of material or debris coming in contact with them. The covers 12 may also be made of any similar flexible and durable material including various nylons and rubbers, and in the case of military vehicles, other materials made of military fibres that may be unknown to us may be used to meet military criteria.

The general configuration of the first cover housing 17 is shown in FIG. 6. The cover housing 17 consists of an elongated cylindrical hollow housing 22 which is designed to accept the spool 16 of cover material. The elongated cylindrical hollow housing 22 has a diameter so that it can hold the entire cover 12 when it is in its retracted ("rolled-up") position on the spool 16. The first cover housing 17 is open at one end 24 and has a plate 26 fixed to and closing the other end 25 as shown in FIG. 6. The plate 26 includes means for mounting the first cover housing 17 to the frame 106. The plate 26 has a pin 28 projecting from one side thereof into the elongated cylindrical hollow housing 22, and is positioned so as to be in line with the centre thereof to receive the spool 16 of material. The pin 28 may be welded to the plate 26 which in turn may be welded to the elongated cylindrical hollow housing 22, although other attachment methods may be used. The elongated cylindrical hollow housing 22 also includes a slot 30 that is cut along the length thereof, and has a width so as to allow passage of the cover material therethrough.

Figure 4A:
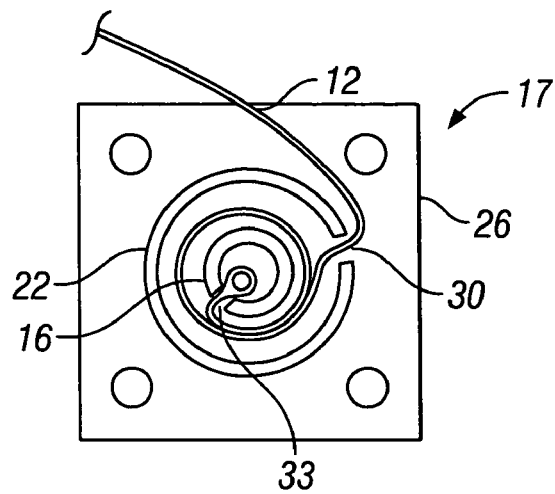
Figure 4B:
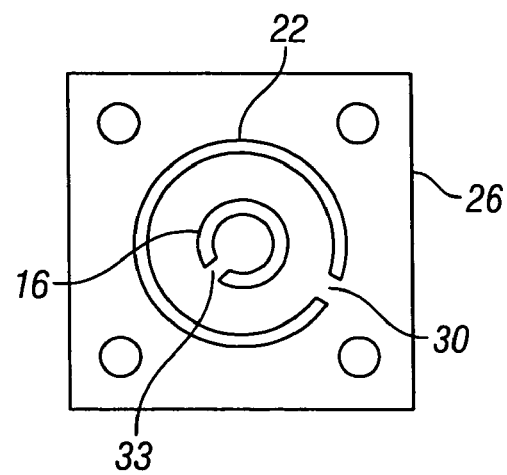

The spool 16 comprises an elongated shaft that is sized so that it may be inserted into the elongated cylindrical hollow housing 22 when the cover 12 is fully wound on the shaft in a fully retracted condition. The spool (or shaft) 16 has a housing-engaging end 32 which is inserted into the elongated cylindrical hollow housing 22 and rotatably mounted on the pin 28, and a free end 34 which is in line with the open end 24 of the elongated cylindrical hollow housing 22. A slot 33 is cut along the length of the spool 16 for receiving an end of the cover 12. A flange 36 extending around the outside of the spool 16 is located proximate to the free end 34 of the spool 16 for bearingly supporting the spool 16 within the elongated cylindrical hollow housing 22 and for ensuring that the cover 12 does not shift along the length of the spool 16. The slot 33 extends through the flange 36, as well. FIGS. 4A and 4B show the end view of the configuration of the cover housing 17 both with and without the cover 12. The cover housing 17 further comprises means for rotating the spool 16 to facilitate the extension and retraction of the cover 12. According to the preferred embodiment, the rotating means comprises a locking-dog mechanism 37 secured to the plate 26 which extends into the interior of the elongated cylindrical hollow housing 22 through a groove 38 cut therein, as shown in FIG. 6. A ratchet wheel or plate 40 (FIG. 6A) is attached to the housing-engaging end 32 of the spool 16 and adapted for engagement with the locking-dog mechanism 37. The free end 34 of the spool 16 is capable of receiving a crank-handle (not shown) or similar operating means for rotating the spool (or shaft) 16 in cover-extending and cover-retracting directions. The locking-dog mechanism 37 and ratchet wheel 40 also permit tightening of any excess slack in the cover 12. When the covers 12 are in either their retracted or extended condition, the open end 24 of the elongated cylindrical hollow housing 22 is closed off by means of a cap 39 that fits around the circumference thereof.

Figure 5A:
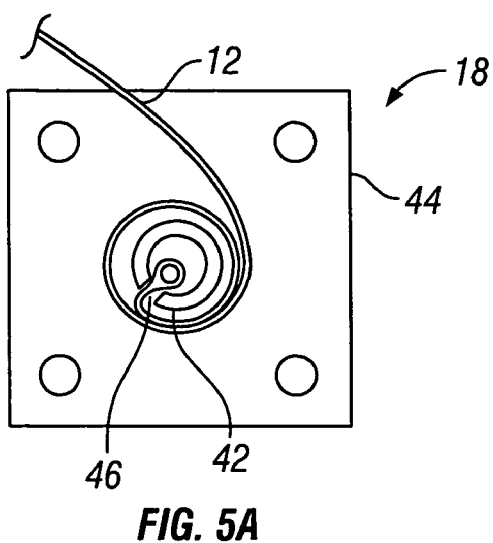
FIG. 5A is a detail side view of the second cover housing of the retractable cover system, which anchors the cover in place when the covers are in use.
Figure 5B:
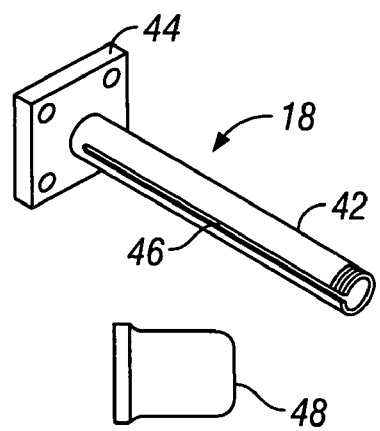
FIG. 5B is an isometric view of the second cover housing, which is secured to the frame of the vehicle.

The second cover housing 18 (see FIGS. 5A and 5B) of the cover system 10, according to the preferred embodiment, also comprises a cylindrical hollow tube 42 having a plate 44 fixed at an inner end thereof, and an open outer end. A slot 46 is cut along the length of the tube 42 for receiving an end of the cover 12. The plate end of the second cover housing 18 is removably mounted to the frame 106 of the vehicle 100 at a distance along the length of the frame 106 opposite the first cover housing 17. When the covers 12 are in use, the free end of the cover 12 is inserted into the slot 46 of the tube 42 and a cap or lid 48 is placed over the open end. For additional security, when anchoring the free end of the cover 12 in place, the cover 12 can be wrapped once around the tube 42 of housing 18 before inserting the material into the slot 46 (see FIG. 5A).

The length of the pipes used for the first and second cover housings 17, 18 are such so as to accommodate the width of the covers 12. The width of the covers 12 will depend on the width of the tires or tracks 104 of the vehicle 100, taking into account some additional width to ensure proper coverage of the tires (or tracks) 104. Approximately 3 inches of additional width is usually sufficient.

The manner in which the ends of the covers 12 are secured to the spool 16 and the tube 42 of the second housing 18 is the same in that the ends of the cover 12 are wrapped around an elongated solid metal or plastic rod member 50 (see FIG. 7) extending the width of the covers 12, and secured to the rod member 50 by any suitable means such as stitching, stapling or heat sealing, therefore encircling the rod member 50 and creating a cover anchor. The cover anchors can be slipped inside the slots 33, 46 of the spool 16 and tube 42 of the first and second cover housings 17, 18. The slots 33, 46 have a width greater than the thickness of the cover but less than the diameter of the rod member 50 so that the cover anchors are retained securely in both the spool 16 and the tube 42. When the covers 12 are in use they can be pulled taut and tightened over the supports 20 with the crank and ratchet mechanism which causes the cover anchors to seal off the slot 46 in the tube 42 of the second cover housing 18 and hold the cover 12 firmly in place, providing a secure "locked-up" condition. The cover housings 17, 18 may also include means to prevent any overloading or over extension of the covers 12, such as by including a built-in spring elastic spacer (not shown).

Figure 2:
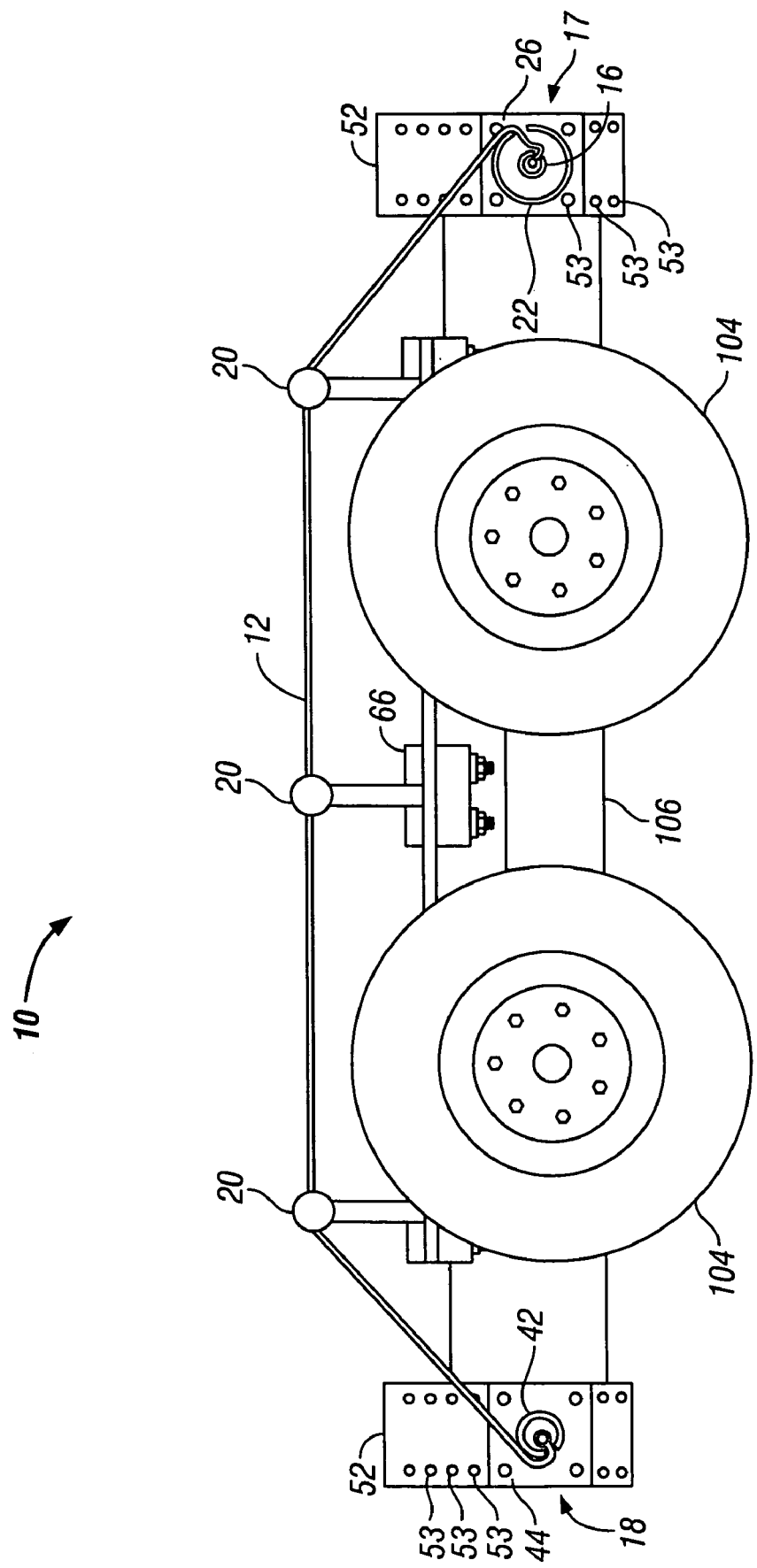
FIG. 2 is a side view of one configuration of the retractable cover system in use over the wheels of a truck.
Figure 3:
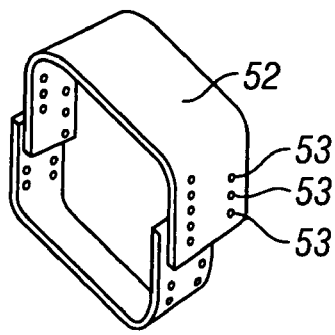
FIG. 3 is an isometric view of the mounting brackets used to install the retractable cover system on the frame of the truck.

The cover housings 17, 18 of the cover system 10 are both attached to the frame 106 of the vehicle 100 by way of mounting brackets 52. The mounting brackets are preferably made from plate steel, are U-shaped, and are designed to meet the maximum frame width specifications of a variety of vehicles. The preferred embodiment of the mounting brackets 52 is shown in FIG. 3. As can be seen in the drawing, a pair of mounting brackets 52 is used to attach the first and second cover housings 17, 18 of the cover system 10 to the frame 106. The mounting brackets 52 are pre-punctured with holes 53 along each side of the legs thereof so that they can be adjusted to suit the frame of a particular vehicle. The pre-puncturing of the mounting brackets 52 also facilitates the mounting of the cover system 10 to a vehicle since both the cover housing 17 and the second housing 18 can be easily bolted to the brackets, as shown in FIG. 2.

Support bars 20 (see FIGS. 8A–8C) are positioned along the length of the frame 106 to prop-up or suspend the covers 12 over the tires (or tracks) 104 of the vehicle 100. The support bars 20 have a mid-portion 54 which spans the width of the frame 106 and have end portions 56 which extend over the tires (or tracks) 104 on either side of the frame 106. The support bars 20 preferably have hexagonal or octagonal cross-sections, although square or round bars may also be used. The support bars 20 are clamped to the frame 106 of the vehicle 100 using any conventional means. The end portions 56 of the support bars 20 have a length sufficient to accommodate the width of the covers 12 to ensure proper coverage of the tires 104. The support bars 20 are protected at their extreme ends with caps 58 made of a suitable material, such as rubber or plastic to avoid possible hazards associated with exposed, sharp edges. In the preferred embodiment, the support bar caps 58 are formed having an opening 60 through the end thereof that is substantially perpendicular to the length of the support bars 20 so that a cable (or the like) 62 can be threaded through the ends of the support bar caps 58 when the cover system 10 is not in use. This creates a type of barrier to prevent objects from becoming trapped between the exposed support bars 20 when the covers 12 are not in use (see FIG. 11A). Alternatively, rather than having a cable 62 threaded through the ends of the support bar caps 58, bungee cords 63 may be used which can hook to the caps 58 themselves (see FIG. 11B).

The support bars 20 may be straight or have a U-shaped mid-portion 54, as shown in FIGS. 8A–8C, which can fit over the frame of a vehicle depending on which structure is better suited to a specific vehicle. The support bars 20 are clamped to the frame 106 (see FIGS. 8B and 8C) using any suitable clamping means 66. According to the preferred embodiment (see FIG. 8D), the clamping means 66 comprises a lug 68 and U-bolt 70 assembly which securely clamps the support bars 20 to the frame 106. The number of support bars 20 used may vary depending on the most appropriate configuration for a specific vehicle. When support bars 20 having the U-shaped mid-portion 54 are used, the amount of clearance between the tops of the tires (or tracks) 104 and the covers 12 can be adjusted as best suited to the vehicle. The adjustment is achieved by rotating the support bar 20 about a horizontal axis to a certain degree and clamping the bar in place, as shown in FIG. 8F.

Figure 17:
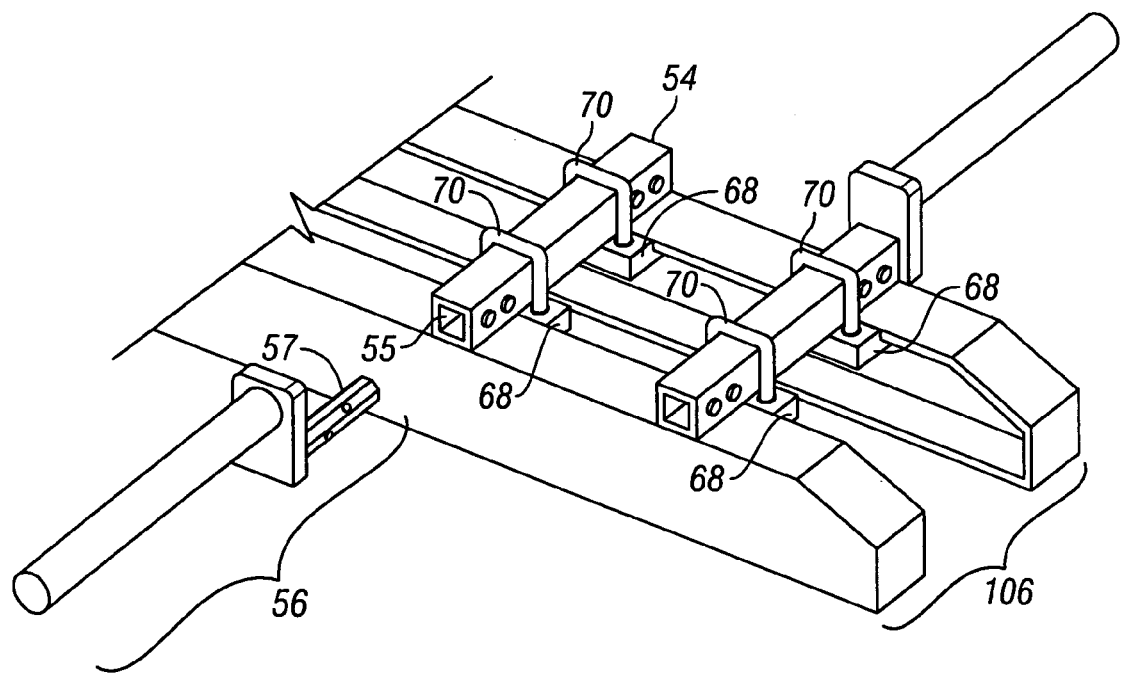
FIG. 17 is a perspective view of another embodiment of the support bars for the cover system.

Alternatively, the support bars 20 may be made of multiple components, as opposed to being formed out of a single piece of material. As shown in FIG. 17, the mid-portion of the support bar 20 which spans the width of the frame 106 of the vehicle may be a separate unit to which the end portions 56 may be connected. In such an embodiment, the mid-potion 54 has open ends 55 on either side thereof which are adapted to receive the corresponding ends 57 of the end portions 56.

Therefore, according to the present invention, the entire cover system 10 can be installed on a vehicle 100 without having to alter the frame 106 by drilling holes or exposing it to high welding temperatures, thus preserving the integrity of the structure. As well, since each of the support bars 20 is mounted independently and since the covers 12 are flexible, the entire cover system 10 can move with the frame 106 of the vehicle 100 and adjust to the bending and twisting of the frame 106 as the vehicle 100 travels over uneven terrain, which could otherwise damage conventional rigid fenders.

Figure 9A:
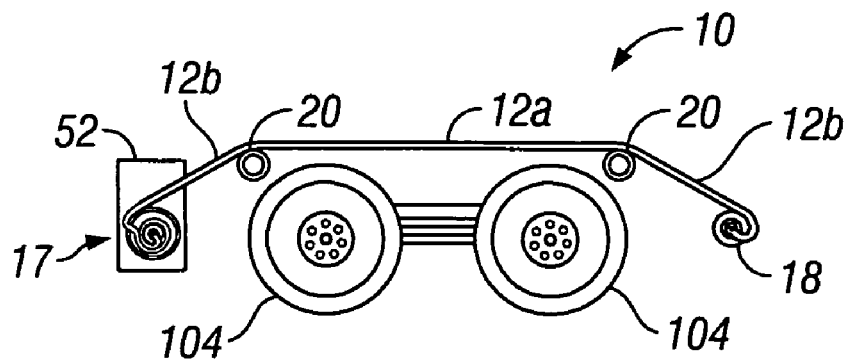
FIGS. 9A–9C are side views of different mounting configurations for the retractable cover system.
Figure 9B:
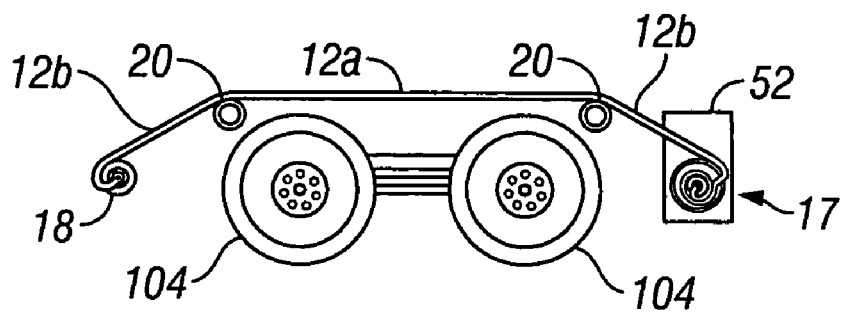
Figure 9C:
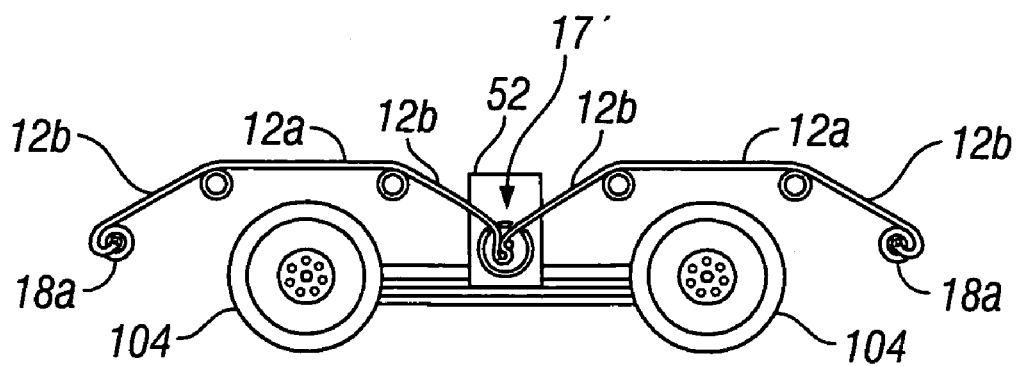
Figure 13:
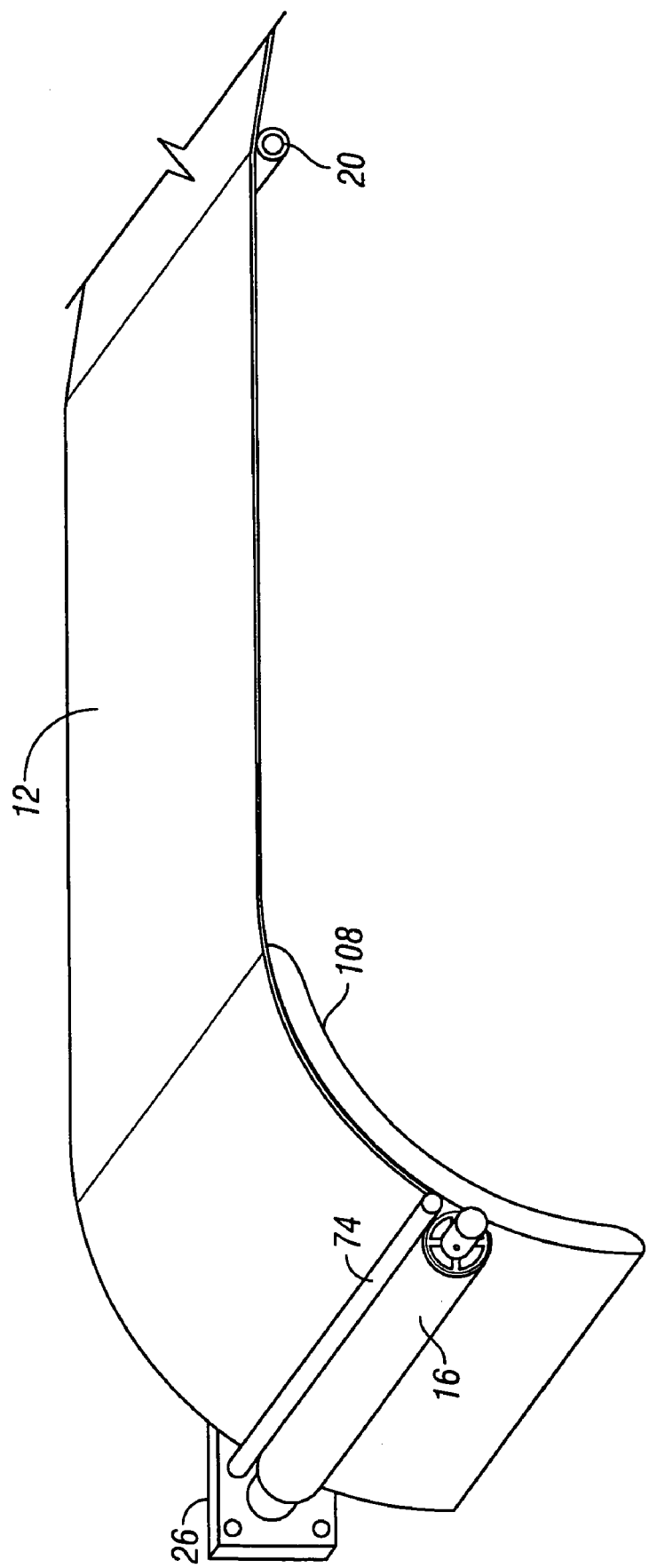
FIG. 13 is a partial perspective view of one side of the cover system according to another embodiment.
Figure 14:
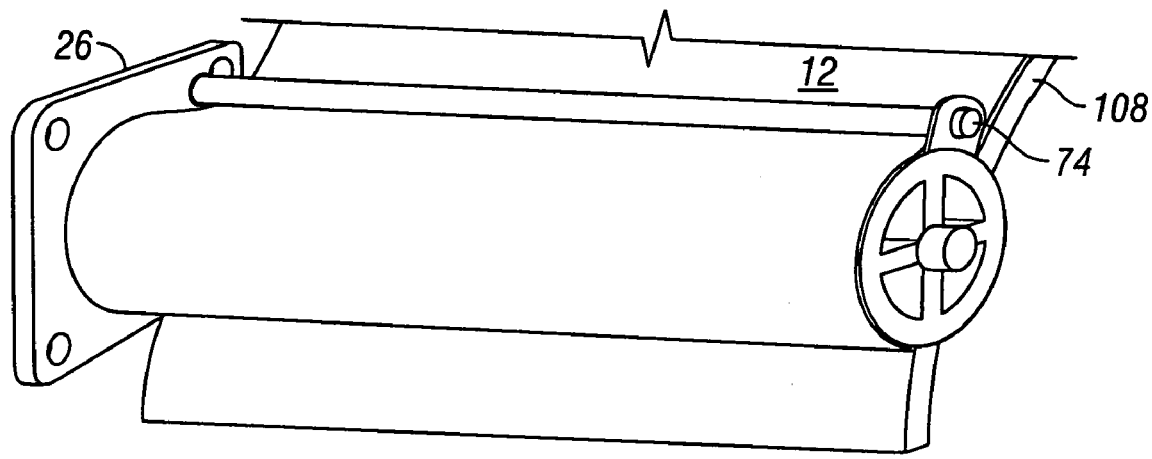
FIG. 14 is front view of the first cover housing according to the embodiment of FIG. 13.
Figure 15:
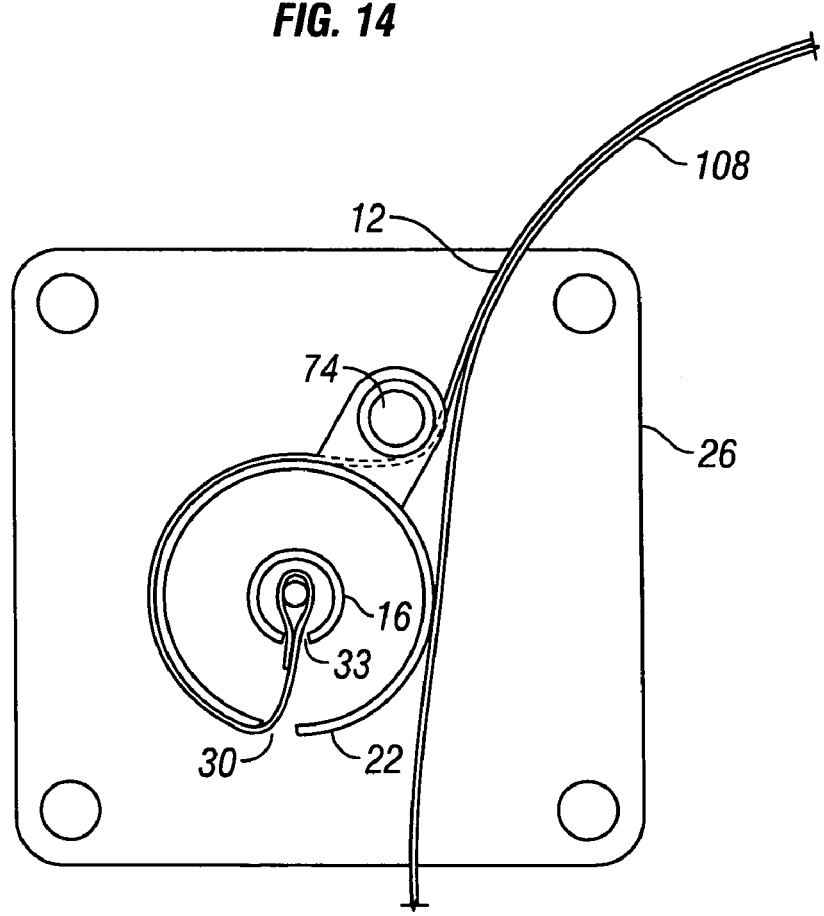
FIG. 15 is an end view of the first cover housing according to the embodiment of FIG. 13.
Figure 16:
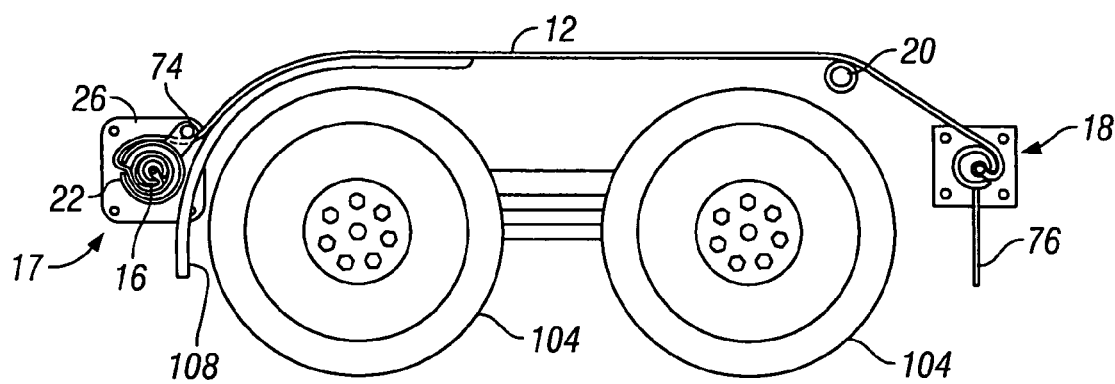
FIG. 16 is a side view of the cover system according to the embodiment of FIG. 13 when installed on a vehicle.

Various configurations of the cover system 10 have been contemplated, as shown in FIGS. 9A–9C. FIGS. 9A and 9B show "Front Spool" and "Rear Spool" configurations wherein the first cover housing 17 is either located forward of the wheels, or rearward of the wheels, with the second cover housing 18 located opposite the first cover housing 17. These configurations are suitable for either double or triple axle applications. FIG. 9C shows a "Centre Spool" configuration wherein the first cover housing 17' is located between the axles of a dual-axle truck, for example, and where there are second and third cover housings 18a, 18b located forward and rearward, respectively, of the wheels, wherein each of the second and third cover housings is adapted to anchor a corresponding end of the cover 12. In such a configuration, the cover housing 17' is of the double outlet type, as shown in FIG. 12B, wherein the elongated cylindrical hollow housing 22' has two slots 30a, 30b spaced a distance apart from each other through which forward and rearward portions of the cover 12 exit the housing 22'. In this embodiment, the spool 16' comprises two parallel rod-like elements 72 and a central section of the cover 12 is snaked around the rods 72, creating a partial figure-8 pattern. The rods 72 are mounted within the elongated cylindrical hollow housing 22' so as to be rotatable together so that the cover 12 is wrapped around both rods 72 when in its fully retracted condition.

When the cover system 10 is mounted to the vehicle 100 and the covers 12 are desired, the crank handle is used to engage the spool 16, 16' and the cover 12 is unwound from the cover housing 17, 17', positioned over the various support bars 20 and anchored in place at the second (and third) cover housing 18 (18*a*, 18*b*). The crank handle is then removed and caps are placed over the exposed ends of the cover housings. The crank handle may also be used to retract the covers and the entire process (whether it be the rolling-out or the retracting) takes approximately 3 to 5 minutes for a single anchor configuration and 4 to 7 minutes for a double anchor configuration which adds to the convenience of the cover system of the present invention. An automatic cable hook-up mechanism may also be incorporated into the design of the cover system 10 to automatically pull the covers 12 over the wheel or track area of the vehicles and release the same into the cover housing 17, 17' without requiring manual labour.

While the above description relates to the retractable cover system when used in conjunction with a commercial truck or trailer, the present invention has applications with numerous types of vehicles. The inventor has considered the applications of the present invention to include but not be limited to common wheeled or track-laying vehicles such as trucks, trailers and ATV's; military equipment including tanks; construction machinery such as loaders, dozers and skidders; farm equipment including tractors; as well as other recreational vehicles including wheeled or tracked amphibious vehicles.

FIGS. 10*a*–10*g* show various schematic configurations of other possible embodiments of the retractable cover system 10 in use with track-laying vehicles. The method of mounting the cover system 10 is similar to that used for common wheeled vehicles in that mounting brackets 52 are used to attach the cover housings 17, 18 to the vehicle, and at least one support bar 20 is positioned along the frame intermediate the cover housings 17, 18 in order to prop up the covers 12 over the tracks 110 of the vehicle. Support bars 20 that span the width of the frame and overhang the tracks 110 on both sides of the vehicle may be used, while in some instances individual support bars 20 for each side of the vehicle may be used, depending on the structure of the vehicle.

In alternative embodiments, the cover housings 17, 18 of the cover system 10 may be telescoping in order to accommodate covers 12 with various widths. In such embodiments, the elongated cylindrical hollow housing 22 of the cover housing 17 and the tube 42 of the second cover housing 18 will telescope to the desired length and the appropriate spool 16 and cover 12 will be mounted in the cover housing 17.

As well, while the preferred embodiment has been described using support bars 20, the covers 12 may be supported or propped up above the tires (or tracks) by means of a combination of support bars 20 and conventional partial fenders 108 that are often already in place over the first set of wheels adjacent the truck cab (See FIGS. 13–16). In such cases, the cover housing 17 is attached to the frame of the vehicle adjacent the conventional partial fender 108 and the cover 12 is draped over the fender 108 and then supported by various support bars 20 along the length of the vehicle. This embodiment further includes a securing rod 74 attached to plate 26 and positioned so that when the cover housing 17 is mounted to the vehicle, the securing rod lies between the cover housing 17 and the partial fender 108 of the vehicle. As the cover 12 exits the cover housing 17 it is then draped under the securing rod 74 to ensure that it is in close proximity to the partial fender 108. Furthermore, conventional mud flaps 76 may also be incorporated into the cover system 10 of the present invention as they can be attached to any one of the cover housings, depending on which one is at the rear of the vehicle.

When in place, as described above, the covers 12 will help to eliminate any spray or debris that may be projected from the treads of the tracks or tires. This will help to prevent damage to the upper body of the vehicle as well as to any surrounding vehicles. The covers will also help reduce the occurrence of large dirt or dust clouds that may be generated by the speed and mobility of vehicles such as military tanks, and gun or personnel carriers. This can help protect the vehicle's positions in the field as the large dust clouds, which can be easily spotted, are minimized. The invention may also include a pipe blow down system working in conjunction with the exhaust system in order to reduce the dust cloud effects.

Therefore, while the present invention has been described with respect to certain preferred embodiments demonstrating the use of the cover system 10 with wheeled and track-laying vehicles, it will be obvious to persons skilled in the art that numerous variations or modifications can be made without departing from the scope of the invention as described herein.

The invention claimed is:

1. A cover system for reducing spray and debris flying from wheels or tracks of a vehicle in motion, comprising, for each side of the vehicle:
    an elongated flexible cover having first and second ends and a width sufficient to extend laterally outwardly beyond an outer extent of the wheels or tracks of the vehicle;
    first and second cover housings, one of said housings adapted to contain said cover in a rolled, retracted condition thereof, and the other of said housings adapted to anchor a free end of said cover in an extended condition thereof, said first housing being removably mountable to a frame of said vehicle forward of said wheels or tracks so as to extend laterally outwardly of said frame, and said second housing being removably mountable to said frame rearward of said wheels or tracks so as to extend laterally outwardly of said frame; and
    at least one support bar removably mountable to said frame intermediate said first and second housings so as to extend laterally of said frame beyond the outer extent of said wheels or tracks for supporting said cover in the extended condition thereof.

2. The cover system of claim 1 including a plurality of mounting brackets removably mountable to said vehicle frame for fixing each of said housings to said frame.

3. The cover system of claim 1 wherein said cover free end includes an elongated rod member extending the width of said cover, said cover free end being secured to said rod member to define a cover anchor.

4. The cover system of claim 1 including clamp means for removably mounting said at least one support bar to said vehicle frame.

5. The cover system of claim 1 wherein said flexible cover has a smooth top surface and a textured lower surface, said lower surface being directed towards said wheels or tracks in the extended condition of said cover.

6. The cover system of claim 1 including means connecting the outer ends of said first and second housings and said at least one support bar for preventing objects from being trapped between said first and second housing and said at least one support bar when said cover is in its fully retracted condition.

7. The cover system of claim 2 wherein said one cover housing comprises: an elongated shaft to which an adjacent end of said cover is secured; an elongated cylindrical hollow housing having an open outer end and a diameter to accommodate said shaft and said cover when said cover is fully wound on said shaft in said retracted condition thereof; a slot extending lengthwise of said cylindrical housing through which said cover can be drawn; a mounting plate at the inner end of said cylindrical housing for removable attachment to a corresponding one of said mounting brackets; and a cap member for sealing said open outer end of said cylindrical housing.

8. The cover system of claim 7 including winding means for extending and retracting said cover from and onto said shaft.

9. The cover system of claim 8 wherein said winding means comprises: a ratchet plate at an inner end of said shaft; locking dog means at the inner end of said cylindrical housing for engagement with said ratchet plate; and crank means engageable with an outer end of said shaft for rotating said shaft in cover extending and cover retracting directions.

10. The cover system of claim 9 including an annular flange secured to said shaft adjacent the outer end thereof for bearingly supporting said shaft within said cylindrical housing and for retaining said cover on said shaft.

11. The cover system of claim 3 wherein said other housing comprises: a cylindrical hollow tube having an inner end and an outer end; a mounting plate at said inner end for removable attachment to a corresponding one of said mounting brackets; a slot extending lengthwise of said tube through which said cover can extend, said slot having a width greater than the thickness of said cover but less than the diameter of said rod member; and a cap for closing said open end of the hollow tube.

12. The cover system of claim 4 wherein said at least one support bar has a mid-portion that spans the vehicle frame and end portions that extend laterally of the frame.

13. The cover system of claim 12 wherein said end portions are removably connectable to said mid-portion.

14. The cover system of claim 12 wherein said at least one support bar is straight.

15. The cover system of claim 12 wherein said mid-portion of said at least one support bar is U-shaped with said end portions extending laterally from the free ends of the legs of said mid-portion.

16. The cover system of claim 5 wherein said flexible cover is made from non-metallic vinyl and threaded rubber.

17. A cover system for reducing spray and debris flying from wheels or tracks of a vehicle in motion, comprising, for each side of the vehicle:
an elongated flexible cover having first and second ends and a width sufficient to extend laterally outwardly beyond an outer extent of the wheels or tracks of the vehicle;
first, second and third cover housings, said first housing adapted to contain said cover in a rolled, retracted condition thereof, and each of said second and third housings adapted to anchor a free end of said cover in an extended condition thereof, said second housing being removably mountable to a frame of said vehicle forward of said wheels or tracks so as to extend laterally outwardly of said frame, said third housing being removably mountable to said frame rearward of said wheels or tracks so as to extend laterally outwardly of said frame, and said first housing being removably mountable to the frame of said vehicle intermediate said second and third housings so as to extend laterally outwardly of said frame;
at least one support bar removably mountable to said frame intermediate said first and second housings so as to extend laterally of said frame beyond the outer extent of said wheels or tracks for supporting a forward portion of said cover in the extended condition thereof; and
at least one support bar removably mountable to said frame intermediate said first and third housings so as to extend laterally of said frame beyond the outer extent of said wheels or tracks for supporting a rearward portion of said cover in the extended condition thereof.

18. The cover system of claim 17 including a plurality of mounting brackets removably mountable to said vehicle frame for fixing each of said housings to said frame.

19. The cover system of claim 17 wherein each of said cover free ends includes an elongated rod member extending the width of said cover, the cover free end being secured to the rod member to define a cover anchor.

20. The cover system of claim 17 including clamp means for removably mounting each of said support bars to said vehicle frame.

21. The cover system of claim 17 wherein said flexible cover has a smooth top surface and a textured lower surface, said lower surface being directed towards said wheels or tracks in the extended condition of said cover.

22. The cover system of claim 17 including means connecting the outer ends of said first, second and third housings and said support bars for preventing objects from being trapped between said first and second housing and said at least one support bar when said cover is in its fully retracted condition.

23. The cover system of claim 18 wherein said first cover housing comprises: a shaft comprising a pair of elongated parallel rods to which a central section of said cover is secured; an elongated cylindrical hollow housing having an open outer end and a diameter to accommodate said shaft and said cover when said cover is fully wound on said shaft in said retracted condition thereof; a pair of slots extending lengthwise of said cylindrical housing through which the forward and rearward portions respectively of said cover can be drawn; a mounting plate at the inner end of said cylindrical housing for removable attachment to a corresponding one of said mounting brackets; and a cap member for sealing said open outer end of said cylindrical housing.

24. The cover system of claim 23 including winding means for extending and retracting said cover from and onto said shaft.

25. The cover system of claim 24 wherein said winding means comprises: a ratchet plate at an inner end of said shaft; locking dog means at the inner end of said cylindrical housing for engagement with said ratchet plate; and crank means engageable with an outer end of said shaft for rotating said shaft in cover extending and cover retracting directions.

26. The cover system of claim 25 including an annular flange secured to said shaft adjacent the outer end thereof for bearingly supporting said shaft within said cylindrical housing and for retaining said cover on said shaft.

27. The cover system of claim 19 wherein each of said second and third housings comprises: a cylindrical hollow tube having an inner end and an outer end; a mounting plate at said inner end for removable attachment to a corresponding one of said mounting brackets; a slot extending lengthwise of said tube through which said cover can extend, said slot having a width greater than the thickness of said cover but less than the diameter of said rod member; and a cap for closing said open end of the hollow tube.

28. The cover system of claim 20 wherein each of said support bars has a mid-portion that spans the vehicle frame and end portions that extend laterally of the frame.

29. The cover system of claim 28 wherein said end portions are removably connectable to said mid-portion.

30. The cover system of claim 28 wherein each of said support bars is straight.

31. The cover system of claim 28 wherein said mid-portion of each of said support bars is U-shaped with said end portions extending laterally from the free ends of the legs of said mid-portion.

32. The cover system of claim 21 wherein said flexible cover is made from non-metallic vinyl and threaded rubber.

33. A cover system for reducing spray and debris flying from wheels or tracks of a vehicle in motion, said vehicle including partial fenders on each side thereof extending upwardly and rearwardly over a front portion of said wheels or tracks, said cover system comprising, for each side of the vehicle:
an elongated flexible cover having first and second ends and a width sufficient to extend laterally outwardly beyond an outer extent of the wheels or tracks of the vehicle;
a first cover housing adapted to contain said cover in a rolled, retracted condition thereof, said first housing being removably mountable to a frame of said vehicle forward of said wheels or tracks adjacent the partial fender so as to extend laterally outwardly of said frame;
a second cover housing adapted to anchor a free end of said cover in an extended condition thereof, said second housing being removably mountable to said frame rearward of said wheels or tracks so as to extend laterally outwardly of said frame;
at least one support bar removably mountable to said frame intermediate said first and second housings and located downstream of the partial fender so as to extend laterally of said frame beyond the outer extent of said wheels or tracks for supporting said cover in the extended condition thereof; and
a securing rod positioned intermediate said first cover housing and said partial fender to ensure said cover rests against said partial fender when said cover is in said extended condition.

34. The cover system of claim 33 including a plurality of mounting brackets removably mountable to said vehicle frame for fixing each of said housings to said frame.

35. The cover system according to claim 33, wherein said first cover housing comprises: an elongated shaft to which an adjacent end of said cover is secured; an elongated cylindrical hollow housing having an open outer end and a diameter to accommodate said shaft and said cover when said cover is fully wound on said shaft in said retracted condition thereof; a slot extending lengthwise of said cylindrical housing through which said cover can be drawn; a mounting plate at the inner end of said cylindrical housing for removable attachment to a corresponding one of said mounting brackets; and a cap member for sealing said open outer end of said cylindrical housing; said securing rod being attached to said mounting plate and extending parallel to said elongated cylindrical hollow housing.

36. The cover system of claim 33 wherein each of said cover free ends includes an elongated rod member extending the width of said cover, the cover free end being secured to the rod member to define a cover anchor.

37. The cover system of claim 33 wherein said second cover housing comprises: a cylindrical hollow tube having an inner end and an outer end; a mounting plate at said inner end for removable attachment to a corresponding one of said mounting brackets; a slot extending lengthwise of said tube through which said cover can extend, said slot having a width greater than the thickness of said cover but less than the diameter of said rod member; and a cap for closing said open end of the hollow tube.

38. The cover system of claim 33 including clamp means for removably mounting said at least one support bar to said vehicle frame.

39. The cover system of claim 33 wherein said flexible cover has a smooth top surface and a textured lower surface, said lower surface being directed towards said wheels or tracks in the extended condition of said cover.

40. The cover system of claim 33 including means connecting the outer ends of said first and second housings and said at least one support bar for preventing objects from being trapped between said first and second housing and said at least one support bar when said cover is in its fully retracted condition.

41. The cover system of claim 35 including winding means for extending and retracting said cover from and onto said shaft.

42. The cover system of claim 41 wherein said winding means comprises: a ratchet plate at an inner end of said shaft; locking dog means at the inner end of said cylindrical housing for engagement with said ratchet plate; and crank means engageable with an outer end of said shaft for rotating said shaft in cover extending and cover retracting directions.

43. The cover system of claim 41 including an annular flange secured to said shaft adjacent the outer end thereof for bearingly supporting said shaft within said cylindrical housing and for retaining said cover on said shaft.

44. The cover system of claim 38 wherein said at least one support bar has a mid-portion that spans the vehicle frame and end portions that extend laterally of the frame.

45. The cover system of claim 44 wherein said end portions are removably connectable to said mid-portion.

46. The cover system of claim 44 wherein said at least one support bar is straight.

47. The cover system of claim 44 wherein said mid-portion of said at least one support bar is U-shaped with said end portions extending laterally from the free ends of the legs of said mid-portion.

48. The cover system of claim 39 wherein said flexible cover is made from non-metallic vinyl and threaded rubber.

* * * * *